May 9, 1933.  G. WEBER  1,907,632
DOUBLE TOOL HOLDER
Filed Feb. 26, 1931  2 Sheets-Sheet 1

Inventor:
Gustav Weber

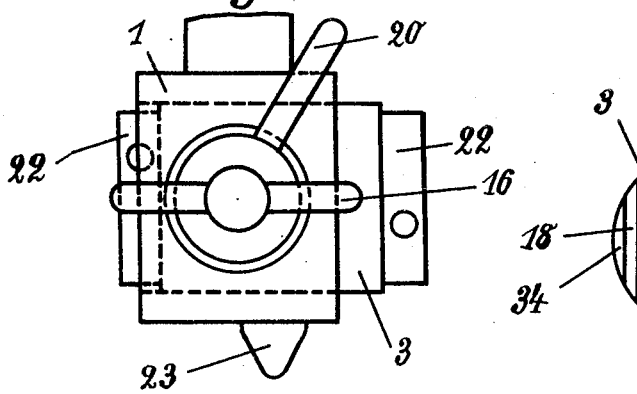
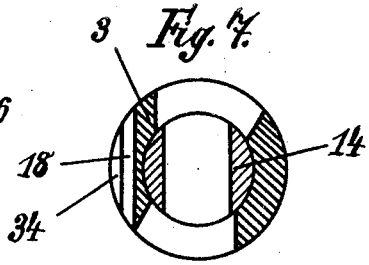
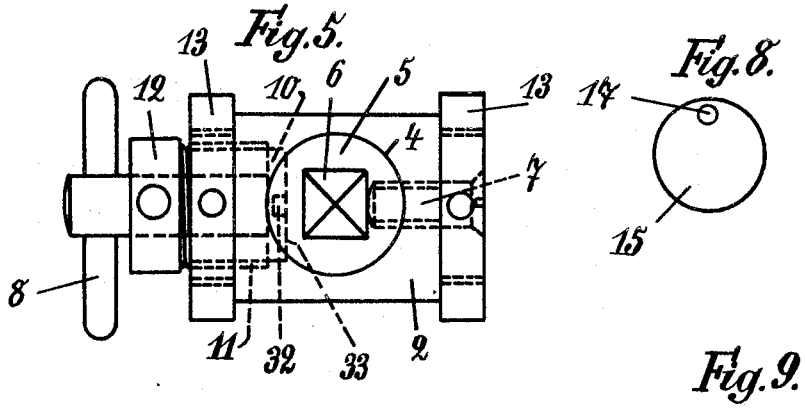
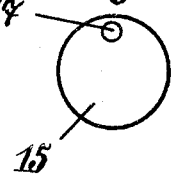
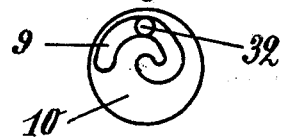
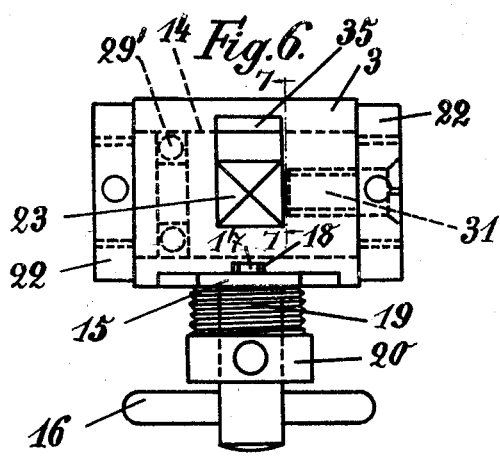

Patented May 9, 1933

1,907,632

UNITED STATES PATENT OFFICE

GUSTAV WEBER, OF HALBERSTADT, GERMANY, ASSIGNOR TO RENÉ WEILL, OF PARIS, FRANCE

DOUBLE TOOL HOLDER

Application filed February 26, 1931, Serial No. 518,471, and in Germany March 7, 1930.

This invention relates to a double tool holder for utilizing the return movement on planing and shaping machines in which the two planing tools are fastened in rotatable drums mounted in the tool holder casing. The bearing cylinder of one tool has a bore arranged at right angles to the axis and designed to guide a slidable element adjustable from the outer side and carrying the planing tool, whereas in the bearing cylinder of the other tool a sleeve is inserted designed to carry the planing tool and laterally adjustable from the outer side together with the bearing cylinder. The new arrangement enables an accurate mutual adjustment of both tools.

Two embodiments of the invention are illustrated by way of example in the accompanying drawings in which:

Fig. 4 is a front elevation of the device shown in Fig. 1.

Fig. 5 shows in top plan view a bearing cylinder removed from the casing.

Fig. 6 is a top plan view of the other bearing cylinder.

Fig. 7 is a cross section on line 7—7 of Fig. 6 the tool being omitted.

Fig. 8 is an elevation of the adjusting eccentric disc.

Fig. 9 is an elevation of the adjustment grooved disc.

Figure 1:
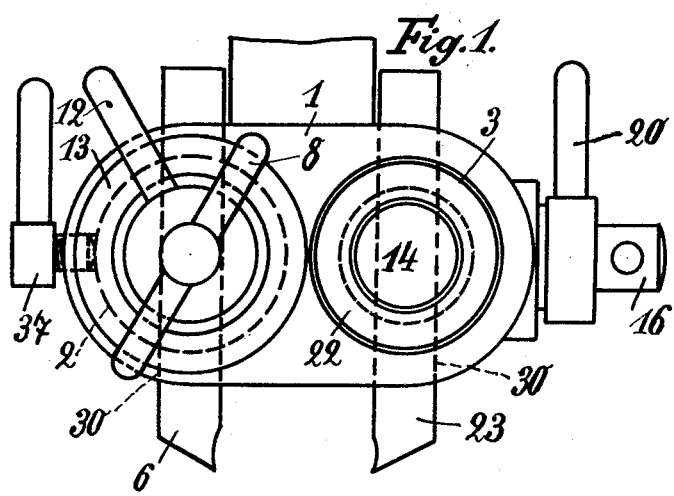
Fig. 1 shows in side elevation a double tool holder with tools situated one behind the other.
Figure 2:
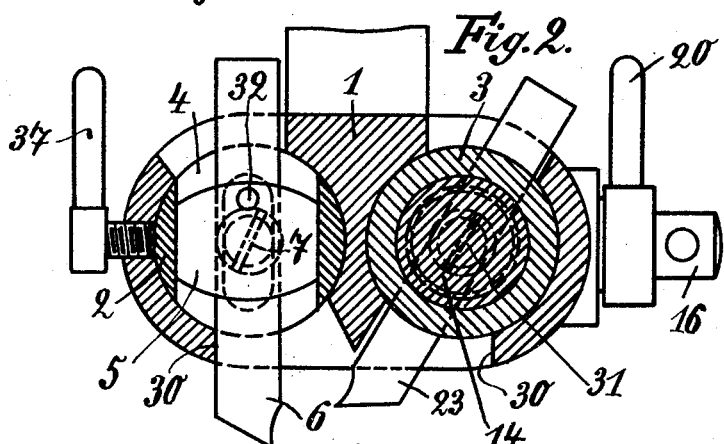
Fig. 2 is a longitudinal section through the tool holder illustrated in Fig. 1.
Figure 3:
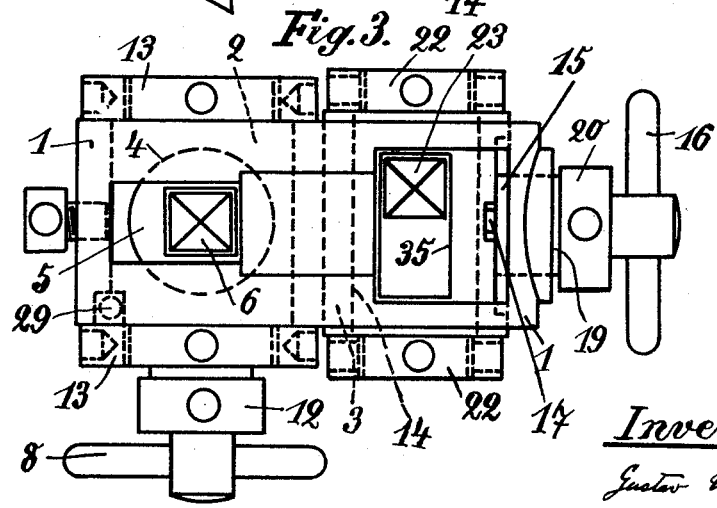
Fig. 3 is a top plan view of the device shown in Fig. 1.

Two bearing cylinders 2 and 3 are arranged, parallel one behind the other (Figs. 1 to 3), in a casing 1 of the tool holder. A slidable element 5 is arranged adjustable in height in a bore 4 of the bearing cylinder 2 extending at right angles to the axis thereof. This slidable element 5 is provided with a square hole for accommodating a planing tool 6, which is fixed by a pressure screw 7 (Figs. 2 and 5). The height adjustment of the slidable element 5 is effected by means of a screw pin provided on its outer end with a handle 8 and carrying on its inner end a disc 10 (Fig. 5) provided with a spiral-shaped groove 9, in which a pin 32, mounted on the slidable element 5 (Fig. 2), engages. This element 5 is provided with a flat surface 33 against which the disc 10 bears. After the height adjustment has been effected, the disc 10 is pressed against the flat surface 33 of the slidable element 5 by a screw bolt 11 by actuating a lever 12, so that the tool 6 is clamped in the adjusted height position. The flat surface 33 prevents a turning of the slidable element 5 in the bore 4. The lateral shifting of the cylinder 2 is prevented by two screw threaded rings 13.

A sleeve 14 (Fig. 6) is arranged in the second bearing cylinder 3, in which sleeve a tool 23 is fixed in a square hole 35 by means of a pressure screw 31. The lateral adjustment of the cylinder 3 is effected by means of a disc 15 (Fig. 8) on which a pin 17 is mounted eccentrically which is slidable in a vertical groove 18 of the cylinder 3 by means of a handle 16, on the screw pin of which the eccentric pin disc 15 is keyed. The cylinder 3 is provided with a flat surface 34 (Fig. 7) and a screw bolt 19 presses the eccentric pin disc 15 against this flat surface 34 on the handle 20 being turned, so that the cylinder 3 is secured against lateral displacement in the casing 1. The cylinder 3 is laterally guided by two screw threaded rings 22.

I claim:—

A double tool holder, comprising in combination a casing, two bearing cylinders arranged the one behind the other in said casing, the first of said cylinders having a bore at right angles to the axis, a vertically adjustable element slidably mounted in said bore carrying one of the tools, and having a flat surface for preventing said element from turning in said bore, a pressure screw holding the tool in said element, a screw pin in said casing, a handle on the outer end of said pin for turning said pin from the outer side of said casing, a disc bearing against the flat surface of said element having a spiral groove on the inner end of said pin, a fixed pin on said slidable element engaging in said spiral groove adapted to effect the height adjustment of said element by the turning of said handle and consequently of said screw pin together with said disc, a screw bolt adapted to press said disc tightly against the flat surface of said element to clamp the tool in adjusted height position, a lever on said bolt projecting from said casing adapted to allow said bolt to be actuated from the outside, two screw threaded rings one on each end of said first cylinder adapted to prevent the lateral shifting of said first cylinder in said casing, the second of said cylinders having a vertical groove and a flat surface, a sleeve in said second cylinder carrying the second tool, a second disc on the outer side of said second cylinder, a pin eccentrically mounted in said second disc engaging in said vertical groove, a screw pin in said casing carrying on its inner end said disc, a handle on the outer end of said screw pin adapted to turn said disc through said screw pin and effect the lateral displacement of said second cylinder by means of said eccentric pin acting in said groove, a screw bolt on said screw pin adapted on the turning of said handle to press said eccentric pin disc against the flat surface of said second cylinder and secure said second cylinder against lateral displacement in said casing, and two screw threaded rings one on each end of said second cylinder adapted to laterally guide said second cylinder.

In testimony whereof I affix my signature.

GUSTAV WEBER.